United States Patent
Knocke et al.

(10) Patent No.: US 7,897,070 B2
(45) Date of Patent: Mar. 1, 2011

(54) AMORPHOUS SILICA COATING FOR HEAT REFLECTIVITY AND HEAT RESISTANCE

(75) Inventors: James Joseph Knocke, Cleveland, TN (US); Al Beatty, Monticello, GA (US); Thomas R. Sharp, Duluth, GA (US)

(73) Assignee: Envirotrol, Inc., Conyers, GA (US)

( * ) Notice: Subject to any disclaimer, the term of this patent is extended or adjusted under 35 U.S.C. 154(b) by 418 days.

(21) Appl. No.: 11/803,469

(22) Filed: May 15, 2007

(65) Prior Publication Data

US 2007/0232731 A1  Oct. 4, 2007

Related U.S. Application Data

(63) Continuation-in-part of application No. 11/728,073, filed on Mar. 23, 2007, now abandoned.

(60) Provisional application No. 60/801,920, filed on May 19, 2006, provisional application No. 60/785,744, filed on Mar. 24, 2006.

(51) Int. Cl.
| | |
|---|---|
| C09K 21/00 | (2006.01) |
| C08G 18/77 | (2006.01) |
| C08K 5/49 | (2006.01) |
| C08K 3/34 | (2006.01) |
| B60C 1/00 | (2006.01) |

(52) U.S. Cl. .................. 252/601; 252/606; 524/115; 524/492

(58) Field of Classification Search ................. 524/115, 524/492; 252/601, 606
See application file for complete search history.

(56) References Cited

U.S. PATENT DOCUMENTS

| | | | | |
|---|---|---|---|---|
| 3,839,253 A | * | 10/1974 | Kershaw et al. | 523/206 |
| 2002/0171068 A1 | * | 11/2002 | Erismann et al. | 252/606 |
| 2004/0194657 A1 | * | 10/2004 | Lally | 106/18.12 |

* cited by examiner

*Primary Examiner*—Mark Eashoo
*Assistant Examiner*—Angela C Scott
(74) *Attorney, Agent, or Firm*—Dickinson Wright PLLC; Harold W. Milton, Jr.

(57) ABSTRACT

A composition for improving the heat reflectivity and the heat resistance of a metal substrate. The coating composition comprises a latex resin including acrylic polymers; silica; and a fire retardant including at least one of a phosphated pentaerythritol ammonium salt, an organo-polyphosphate ammonium salt, an ammonium salt, and a Magnesium salt. The silica reflects and resists heat. Additionally, the silica raises the decomposition temperature of the resin by insulating the resin from heat and reflecting heat away from the resin. This, in turn, increases the ability of the composition to maintain its bond to the substrate at high temperatures. As such, the coating remains on the substrate where it reflects and resists heat, i.e., it does not easily brush or rub off after several hours of exposure to high heat. The silica can be rice hull silica.

18 Claims, No Drawings

US 7,897,070 B2

AMORPHOUS SILICA COATING FOR HEAT REFLECTIVITY AND HEAT RESISTANCE

CROSS REFERENCE TO RELATED APPLICATION

This application claims the benefit of provisional application Ser. No. 60/801,920 filed May 19, 2006, and is a continuation-in-part of application Ser. No. 11/728,073 filed Mar. 23, 2007, now abandoned which claims the benefit of provisional application Ser. No. 60/785,744 filed Mar. 24, 2006.

BACKGROUND OF THE INVENTION

1. Field of the Invention

The invention relates to a heat resistant coating composition.

2. Description of the Prior Art

Heat resistant and heat reflective coatings are often used to protect substrates from exposure to high heat, which heat can degrade the structural integrity of the substrate.

It is known to use a fire retardant material such as a phosphated pentaerythritol ammonium salt, an organo-polyphosphate ammonium salt, an ammonium salt, and/or a Magnesium salt to protect against heat and flame. These fire retardant materials serve as a source of acid, which promotes charring, and in some cases, as a source of Nitrogen, which promotes foaming. The charring and foaming combine to retard the effects of high temperatures on the substrate.

It is also known to use latex resins comprising latex polymers to bind together components of a particular composition. Additionally, these latex resins are capable of forming matrices to contact the substrate and bind the composition to the substrate to form a coating.

Although the latex resins can be utilized to coat a substrate, the latex resins typically have decomposition temperatures that are relatively low. As such, when exposed to high heats, the matrices binding the coating to the substrate degrade, thus allowing the coating to separate from the substrate.

SUMMARY OF THE INVENTION AND ADVANTAGES

Accordingly, the invention provides for a heat resistant and heat reflective coating composition comprising a latex resin and a fire retardant as mentioned above and including silica. The silica, the fire retardant, and the latex resin are evenly dispersed among one another in the composition. The silica reflects and resists heat and, in turn, increases the amount of heat necessary to decompose the latex resin by insulating the resin from heat and reflecting heat away from the resin. This allows the coating composition to remain on the substrate where it can reflect and resist heat.

DETAILED DESCRIPTION OF THE INVENTION

The invention provides for a composition for improving the heat reflectivity and the heat resistance of a metal substrate. The composition can be utilized as a coating for many substrates including, but not limited to, steel, kilns, steam pipes, conduit, drywall, and heated tanks. The coating composition comprises a latex resin including latex polymers; silica; and a fire retardant including at least one of a phosphated polyerythritol ammonium salt, an organo-polyphosphate ammonium salt, an ammonium salt, and a Magnesium salt. The resin, the silica, and the fire retardant are evenly dispersed among one another in the composition.

The resin binds together the other components of the composition. Additionally, the resin forms a resin matrix, which resin matrix contacts the substrate and binds the composition to the substrate, thus forming the coating. The resin matrix can be formed at ambient temperatures. As such, the coating composition can be applied and then cured at room temperature. The resin has a decomposition temperature, at which temperature it begins to char. The resin mixture consumes heat as it is charred. The charring reaction consumes heat, which heat would otherwise be consumed by the substrate. This prevents the heat from adversely affecting the substrate. However, as a result of the charring, a portion of the resin matrix is deteriorated.

In the preferred embodiment, the latex resin comprises a mixture of latex polymers, which latex polymers include latex acrylic polymers, and water. Further, the latex resin can comprise trace amounts of latex monomers, ammonia, latex butyl acrylate, styrene, and formaldehyde. Such a resin can be procured from Thermacote, Inc. In the alternative, other resins and resin blends known in the art including, but not limited to, silicone, polyurea, and polyurethane can be utilized. In an exemplary embodiment, the resin can be a viscous liquid.

The volume percentage of the resin in the composition can be within the range of 3% to 30%. More specifically, the volume percentage of the resin in the composition can be 20.10%.

The silica reflects and resists heat. Additionally, the silica increases the amount of heat necessary to decompose the latex resin by insulating the resin from heat and reflecting heat away from the resin. This, in turn, increases the ability of the coating composition to maintain its bond to the substrate at high temperatures. As such, more of the coating remains on the substrate where it reflects and resists heat, i.e., it does not easily brush or rub off after several hours of exposure to temperatures above 1900° F.

In an exemplary embodiment, the silica can be rice hull silica. In the alternative, other sources of silica known in the art, can be utilized. Additionally, silicates can be substituted for silica. The rice hull silica can be in the amorphous state. The rice hull silica is produced by heating and grinding rice hulls. The resultant product is an ashen powder. The powder can be sifted to achieve particles ranging in diameter from 2 to 60 microns. The powder can be even further sifted to achieve particles ranging in diameter from 2 to 8 microns. In an exemplary embodiment, the rice hull silica added to the composition can be a mixture of the 2 to 8 micron rice hull silica and the 2 to 60 micron rice hull silica.

The volume percentage of the silica in the composition can be within the range of 1% to 80%. More specifically, the volume percentage of the silica in the composition can be 24.12%. In an exemplary embodiment, both the volume percentage of the 2 to 8 micron rice hull silica and the volume percentage of the 2 to 60 micron rice hull silica in the composition can be within the range of 0% to 40%. Further, the 2 to 8 micron rice hull silica can comprise 16.08 volume %; and the 2 to 60 micron rice hull silica can comprise 8.04 volume %, i.e., a 2:1 ratio, respectively.

The fire retardant acts as a source of acid, and, optionally, as a source of Nitrogen. The invention utilizes a phosphated pentaerythritol ammonium salt, which is a source of both acid and Nitrogen. Alternatively, organo-polyphosphate ammonium salts, ammonium salts, and Magnesium salts can be utilized alone or in combination with one another or in combination with the phosphated pentaerythritol ammonium salt. The acid promotes and stimulates the charring of the latex resin at high heat. Additionally the acid can promote and stimulate the charring of other organic materials that may be added to the composition. The Nitrogen promotes foaming, which foaming retards flaming and smoking. The fire retardant is typically in liquid form, but, in the alternative, one in powder form can be utilized. Other acid sources known in the art including, but not limited to, borates, sulfates, nitrates, phosphates, phosphonates, and the respective salts thereof can be utilized. Similarly, other Nitrogen sources known in the art including, but not limited to, amines, ureas, guanidines, guanamines, s-triazines, melamine, amino acids, and the respective salts thereof can be utilized. Further, polyols (other than phosphated pentaerythritol), including glycols and glycol ethers and the respective salts thereof can be utilized, as can the partial salts of Zinc and other metals.

The volume percentage of the fire retardant in the composition can be within the range of 2% to 35%. More specifically, the volume percentage of the fire retardant in the composition can be 18.09%.

A heat reflective material can be added to the composition to supplement the rice hull silica to further raise the decomposition temperature of the latex resin. In an exemplary embodiment, the heat reflective material can be a viscous liquid comprising clay, gypsum, additional silica, and water. Such a heat reflective material can be procured from Thermacote, Inc. Alternatively, the heat reflective material can comprise other heat reflective materials known in the art to reflect and/or resist heat.

The volume percentage of the heat reflective material in the composition can be within the range of 0% to 40%. More specifically, the volume percentage of the heat reflective material in the composition can be 10.05%.

Hydrated alumina can be added to the composition to provide Aluminum and water. As the hydrated alumina is exposed to high heat, water is produced. The water can control flaming and smoking. Additionally, the Aluminum atoms react with Magnesium and silica to form salts. The salts contribute to the development of an additional matrix. The additional matrix engages the substrate to further bind the composition to the substrate. The additional matrix is formed at high heat. The additional matrix complements the resin matrix and aids in bonding the coating to the substrate. As the portion of the resin matrix is lost due to charring, the additional matrix can provide an additional bond from the coating composition to the substrate.

The volume percentage of the hydrated alumina in the composition can be within the range of 0% to 25%. More specifically, the volume percentage of the hydrated alumina in the composition can be 5.03%.

Zinc Oxide can be added to the composition to provide Zinc. The Zinc reacts with the hydrated alumina to form the additional matrix. The volume percentage of the Zinc Oxide in the composition can be within the range of 0% to 20%. More specifically, the volume percentage of the Zinc Oxide in the composition can be 2.51%.

A fluid can be added to the composition to adjust the viscosity of the composition based on individual applications. Additionally, the fluid can support the resin, fire retardant, silica, heat reflective material, hydrated alumina, and the Zinc Oxide in a suspension. The fluid makes up the remainder of the volume percentage of the composition.

In an exemplary embodiment, the fluid can be water. Water can be utilized in a particular composition that includes a latex resin. Other fluids can also be utilized dependent upon the resin utilized in the particular composition. As an example, mineral spirits can be utilized in a particular composition that includes an alkyd enamel resin.

The volume percentage of the fluid in the composition can be within the range of 94% to 0%. More specifically, the volume percentage of the fluid in the composition can be 20.10%.

As an example application, the coating composition can be applied to steel to prevent the loss of structural integrity of the steel in a fire. Further, the coating can then be re-applied to the steel after the steel has been exposed to temperatures above the charring point of the composition, i.e., another layer of coating can be applied to further protect the steel.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A composition for improving the heat resistance of a substrate comprising;
    a latex resin including latex polymers,
    a fire retardant including at least one of a phosphated pentaerythritol ammonium salt and an organo-polyphosphate ammonium salt and an ammonium salt and a magnesium salt, and
    characterized by the inclusion of silica with said silica and said latex resin and said fire retardant being evenly dispersed among one another in said composition,
    wherein the volume percentage of said latex resin in said composition is 20.10%.

2. A composition as set forth in claim 1 wherein said latex resin is further defined to include latex monomers and ammonia and latex butyl acrylate and styrene and formaldehyde each in trace amounts.

3. A composition as set forth in claim 2 wherein said latex resin is further defined to include water.

4. A composition as set forth in claim 1 wherein the volume percentage of said fire retardant in said composition is within the range of 2% to 35%.

5. A composition as set forth in claim 4 wherein the volume percentage of said fire retardant in said composition is 18.09%.

6. A composition as set forth in claim 1 including a heat reflective material.

7. A composition as set forth in claim 6 wherein the volume percentage of said heat reflective material in said composition is less than or equal to 40%.

8. A composition as set forth in claim 7 wherein the volume percentage of said heat reflective material in said composition is 10.05%.

9. A composition as set forth in claim 1 including hydrated alumina.

10. A composition as set forth in claim 9 wherein the volume percentage of said hydrated alumina in said composition is less than or equal to 25%.

11. A composition as set forth in claim 10 wherein the volume percentage of said hydrated alumina in said composition is 5.03%.

12. A composition as set forth in claim 1 including zinc oxide.

13. A composition as set forth in claim 12 wherein the volume percentage of said zinc oxide in said composition is less than or equal to 20%.

14. A composition as set forth in claim 13 wherein the volume percentage of said zinc oxide in said composition is 2.51%.

15. A composition as set forth in claim 1 including a fluid for adjusting the viscosity of said composition and for suspending said resin and said fire retardant and said silica therein.

16. A composition as set forth in claim 15 wherein said fluid is water.

17. A composition as set forth in claim 16 wherein the volume percentage of said water in said composition is 20.10%.

18. A composition for improving the heat resistance of a metal substrate comprising;
   a latex resin including latex polymers and trace amounts of latex monomers and ammonia and latex butyl acrylate and styrene and formaldehyde and water,
   said latex resin having a volume percentage in said composition being 20.10%,
   a heat reflective material having a volume percentage in said composition being 5.03%,
   a hydrated alumina having a volume percentage in said composition being less than or equal to 25%,
   a zinc oxide having a volume percentage in said composition being 2.51%,
   a fire retardant having a volume percentage in said composition being 18.09%,
   said fire retardant including at least one of a phosphated pentaerythritol ammonium salt and an organo-polyphosphate ammonium salt and an ammonium salt and a magnesium salt,
   a fluid for adjusting the viscosity of said composition and for suspending said latex resin and said fire retardant and said heat reflective material and said hydrated alumina and said zinc oxide therein,
   said fluid being water and having a volume percentage in said composition being 20.10%,
   a silica having particles with a diameter between 2 and 60 microns,
   said silica having a volume percentage in said composition being 24.12%,
   said silica and said latex resin and said heat reflective material and said hydrated alumina and said zinc oxide and said fire retardant being evenly dispersed among one another and being suspended by said water,
   said silica being in the amorphous state, and
   said silica being rice hull silica.

* * * * *